United States Patent
Liu et al.

(10) Patent No.: US 11,037,003 B2
(45) Date of Patent: Jun. 15, 2021

(54) ELECTRONIC DEVICE AND METHOD FOR DETECTING OBSTACLE

(71) Applicant: HON HAI PRECISION INDUSTRY CO., LTD., New Taipei (TW)

(72) Inventors: Young-Way Liu, New Taipei (TW); Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/598,727

(22) Filed: Oct. 10, 2019

(65) Prior Publication Data
US 2020/0116861 A1 Apr. 16, 2020

(30) Foreign Application Priority Data
Oct. 10, 2018 (TW) ................................ 107135672

(51) Int. Cl.
| | |
|---|---|
| *G06K 9/00* | (2006.01) |
| *G01S 17/06* | (2006.01) |
| *G05D 1/02* | (2020.01) |
| *G01S 17/04* | (2020.01) |
| *G05D 1/00* | (2006.01) |
| *B60R 11/04* | (2006.01) |

(52) U.S. Cl.
CPC .......... *G06K 9/00805* (2013.01); *B60R 11/04* (2013.01); *G01S 17/04* (2020.01); *G01S 17/06* (2013.01); *G05D 1/0088* (2013.01); *G05D 1/0214* (2013.01); *G05D 1/0242* (2013.01); *G05D 1/0246* (2013.01); *B60R 2300/8093* (2013.01); *Y10S 901/01* (2013.01)

(58) Field of Classification Search
CPC . B60R 11/04; B60R 2300/8093; G01S 17/04; G01S 17/06; G05D 1/0088; G05D 1/0214; G05D 1/0242; G05D 1/0246; G06K 9/00805; G06T 1/0014; G06T 7/55; G06T 7/593; G06T 7/596; G06T 2207/30261; Y10S 901/01
USPC ......................................... 356/614; 382/154
See application file for complete search history.

(56) References Cited

U.S. PATENT DOCUMENTS

2008/0249659 A1* 10/2008 Ueyama ................ B25J 9/0018
  700/245
2019/0172215 A1*  6/2019 Zhang ..................... G06T 7/579

FOREIGN PATENT DOCUMENTS

| CN | 102354364 A | 2/2012 |
|---|---|---|
| CN | 104299244 A | 1/2015 |
| CN | 104317302 A | 1/2015 |

(Continued)

Primary Examiner — Colin W Kreutzer
(74) Attorney, Agent, or Firm — ScienBiziP, P.C.

(57) ABSTRACT

A method for detecting an obstacle applicable in an electronic device includes detecting whether at least one object is within a line of sight of an image capturing device. The image capturing device is controlled to capture a first image of the object and the image capturing device is caused to move until a capturing angle for capturing another image of the object is changed. The image capturing device is controlled to capture a second image of the object and a determination is made as to whether the object in the first image is the same as the object in the second image. For such (Continued)

recognized objects, the object is determined to be a non-planar obstacle when the object in the first image is not the same as the object in the second image.

16 Claims, 6 Drawing Sheets

(56) References Cited

FOREIGN PATENT DOCUMENTS

CN 106764334 A 5/2017

* cited by examiner

ELECTRONIC DEVICE AND METHOD FOR DETECTING OBSTACLE

CROSS-REFERENCE TO RELATED APPLICATIONS

This application claims priority to Taiwanese Patent Application No. 107135672 filed on Oct. 10, 2018, the contents of which are incorporated by reference herein.

FIELD

The subject matter herein generally relates to automatic control of electronic devices, and particularly to an electronic device and a method for detecting an obstacle.

BACKGROUND

Smart electronic devices, such driverless cars and sweeper robots, require to detect obstacles to avoid collisions when moving. Thus, multiple cameras or sensors are utilized to detect the obstacles. However, a multiple cameras design increases hardware cost and power consumption of the electronic devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
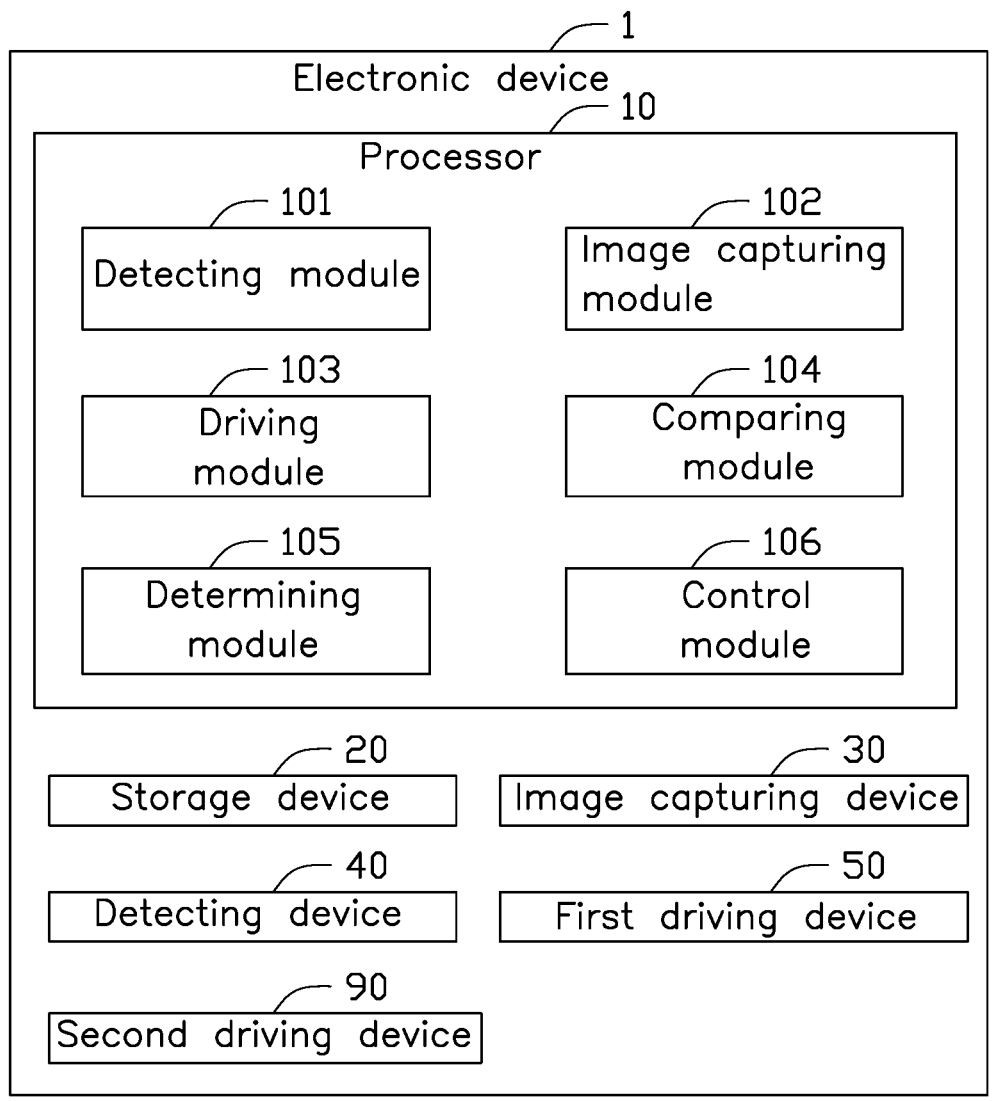
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a block diagram of an embodiment of an electronic device 1. In at least one embodiment, the electronic device 1 can be a driverless vehicle, a sweeper robot, and other moving electronic appliance. The electronic device 1 can determine whether an object is an obstacle, by single camera device, thus avoiding collisions.

The electronic device 1 includes, but is not limited to, a processor 10, a storage device 20, a detecting device 30, an image capturing device 40, and a first driving device 50. FIG. 1 illustrates only one example of the electronic device 1, other examples can include more or fewer components than illustrated, or have a different configuration of the various components in other embodiments.

The processor 10 can be a central processing unit (CPU), a microprocessor, or other data processor chip that performs functions of the electronic device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

In at least one embodiment, the detecting device 30 can be an infrared sensor. The detecting device 30 can transmit infrared rays and receive reflected infrared rays. In at least one embodiment, the image capturing device 40 can be a camera device, the image capturing device 40 can capture images of surrounding environment of electronic device 1. In at least one embodiment, the first driving device 50 can be an electric motor, the first driving device 50 can drive the electronic device 1 to move and/or change orientations.

As illustrated in FIG. 1, the electronic device 1 at least includes a detecting module 101, an image capturing module 102, a driving module 103, a comparing module 104, a determining module 105, and a control module 106. The modules 101-106 can be collections of software instructions stored in the storage device 20 of the electronic device 1 and executed by the processor 10. The modules 101-106 also can include functionality represented as hardware or integrated circuits, or as software and hardware combinations, such as a special-purpose processor or a general-purpose processor with special-purpose firmware.

The detecting module 101 is used to control the detecting device 30 to detect whether at least one object 2 is within a line of sight of the image capturing device 40.

In at least one embodiment, when the electronic device 1 starts to move, the detecting device 30 is controlled to detect whether the at least one object 2 is within the line of sight of the image capturing device 40 in real time.

In detail, the detecting device 30 transmits infrared rays towards front of the electronic device 1. If such infrared rays are reflected, the detecting module 101 calculates a distance between the object 2 and the electronic device 1 according to a time interval between transmitting the infrared rays and receiving the reflected infrared rays, a propagation speed of the infrared rays being known. If the distance is equal to or less than a predetermined distance, the detecting device 30 detects presence of the object 2 within the line of sight of the image capturing device 40. If the distance is greater than the predetermined distance, the detecting device 30 does not detect any object 2 within the line of sight of the image capturing device 40. In at least one embodiment, the predetermined distance can be three meters.

If the object 2 is detected within the line of sight of the image capturing device 40, the image capturing module 102 is used to control the image capturing device 40 to capture a first image of the object 2.

In at least one embodiment, if the detecting device 30 detects that the object 2 is within the line of sight of the image capturing device 40, the image capturing module 102 activates the image capturing device 40, and controls the image capturing device 40 to capture the first image of the object 2.

In other embodiments, when the detecting module 30 detects multiple objects 2 within the line of sight of the image capturing device 40, the image capturing device 40 can capture a first image containing the multiple objects 2.

The driving module 103 is used to control the first driving device 50 to change a capturing angle of the image capturing device 40 for capturing a second image of the object 2.

In at least one embodiment, the driving module 103 controls the first driving device 50 to drive the image capturing device 40 to move until a capturing angle of the image capturing device 40 for capturing the image of the object 2 is changed.

Figure 2:
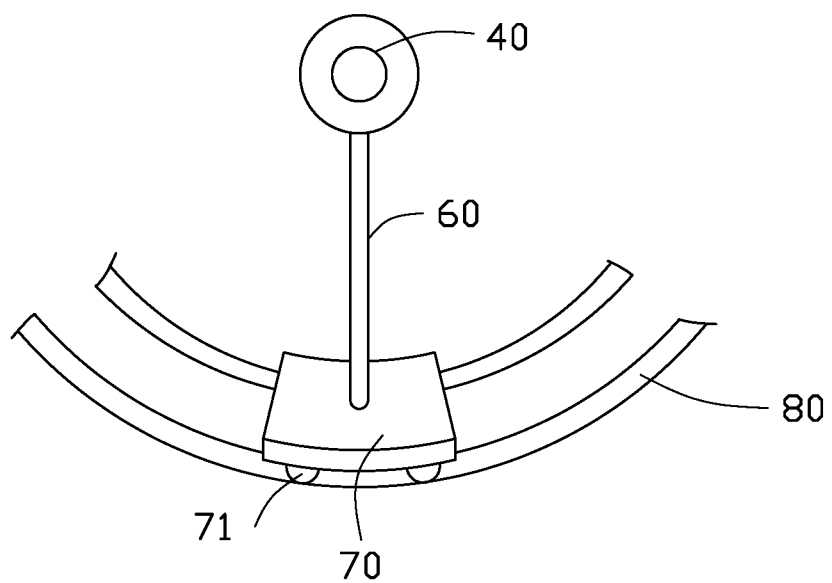
FIG. 2 is a schematic view illustrating an embodiment of an image capturing device in the electronic device of FIG. 1.

Referring to FIG. 2, in a first embodiment, the electronic device 1 further includes a fixing rod 60, a base 70, and a slide rail 80. The image capturing device 40 is arranged on the fixing rod 60. The fixing rod 60 is arranged on the base 70, and the base 70 is movably arranged on the slide rail 80.

In the first embodiment, the base 70 includes a number of wheels 71, and the first driving device 50 is arranged on at least one of the number of wheels 71. In the first embodiment, a quantity of the wheels 71 can be four.

In the first embodiment, the slide rail 80 is curved. The driving module 103 controls the first driving device 50 to drive the number of wheels 71 to slide along the slide rail 80, the base 70 is driven to move along the slide rail 80, and the image capturing device 40 is thus driven to move. Since the slide rail 80 is curved, moving tracks of the base 70 and the image capturing device 40 are both curved, and the capturing angles of the image capturing device 40 for capturing the images of the object 2 are changed by driving the imaging capture device being along the slide rail 80.

Figure 3A:
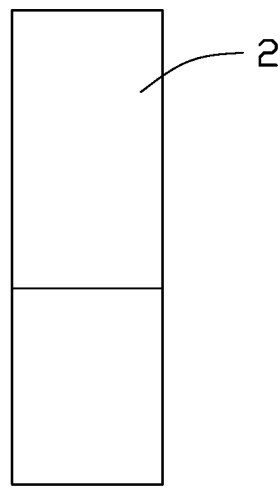
FIG. 3A, and FIG. 3B are schematic views illustrating an embodiment of the image capturing device of the electronic device when in use.
Figure 3A:
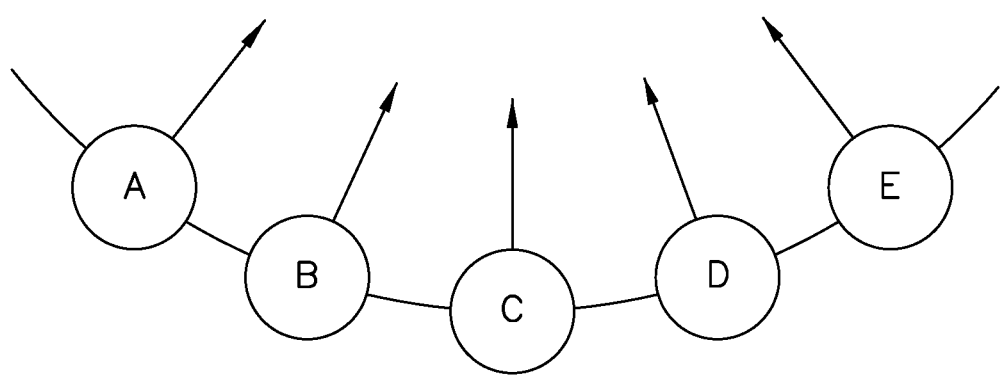
Figure 3B:
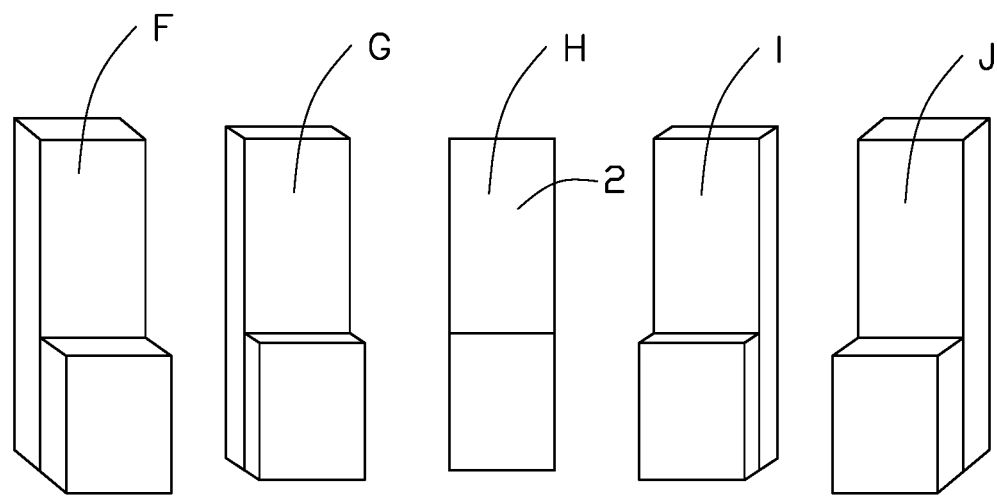

Referring to FIGS. 3A and 3B, for example, an initial position of the image capturing device 40 is a position C, and the image of the object 2 captured by the image capturing device 40 is an image H. When the first driving device 50 drives the image capturing device 40 to arrive at a position B, the capturing angle of the image capturing device 40 for capturing the image of the object 2 is changed, the image of the object 2 captured by the image capturing device 40 is an image G.

Figure 4:
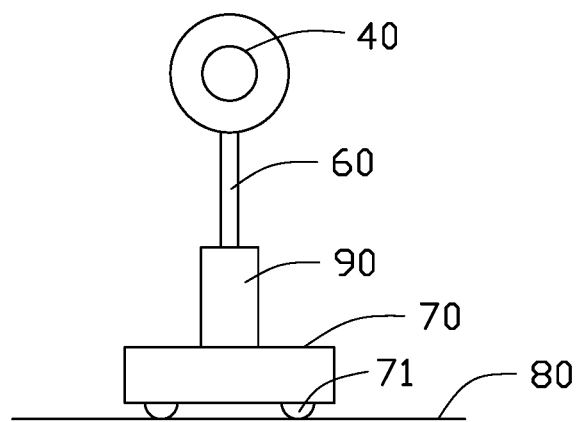
FIG. 4 is a schematic view illustrating another embodiment of the image capturing device.

Referring to FIG. 4, in a second embodiment, the electronic device 1 further includes a bearing member 90. The bearing member 90 is electrically connected with the first driving device 50. The image capturing device 40 and the bearing member 90 are arranged at ends of the fixing rod 60. The bearing member 90 is used to drive the fixing rod 60 to rotate, and the image capturing device 40 is thus driven to change orientations.

In the second embodiment, the slide rail 80 is linear. The base 70 is movably arranged on the slide rail 80. The driving module 103 controls the first driving device 50 to drive the base 70 to move along the slide rail 80, and the image capturing device 40 is thus driven to move. Then the driving module 103 further controls the first driving device 50 to drive the bearing member 90 and the fixing rod 60 to rotate, the image capturing device 40 is thus driven to change orientations, and the capturing angles of the image capturing device 40 for capturing the images of the object 2 are changed by changing the orientations of the image capturing device 40.

When the capturing angle of the image capturing device 40 for capturing the image of the object 2 is changed, the image capturing module 102 is further used to control the image capturing device 40 to capture the second image of the object 2.

In at least one embodiment, when the capturing angle of the image capturing device 40 for capturing the image of the object 2 has been changed one time, the image capturing module 102 controls the image capturing device 40 to capture the second image of the object 2.

In other embodiments, the driving module 103 can control the first driving device 50 to drive the image capturing device 40 to move a predetermined number of times, the capturing angle for capturing the image of the object 2 is different after each move of the image capturing device 40, the image capturing module 102 controls the image capturing device 40 to capture the second image of the object 2 every time that the capturing angle for capturing the image of the object 2 is changed. Thus a number of second images of the object 2 are captured by the image capturing device 40. In the embodiment, the predetermined number can be three times, and the second images of the object 2 captured by the image capturing device 40 are three in number.

The comparing module 104 is used to determine whether the object 2 in the first image is identical with the object 2 in the second image.

In at least one embodiment, the comparing module 104 determines whether the object 2 in the first image is identical with the object 2 in the second image by comparing the first image with the second image, and determining whether contours of the object 2 in the first image and the second image are the same.

In detail, the comparing module 104 recognizes the contours of the object 2 in the first and second images by an edge detection algorithm, and determines whether the contours of the object 2 in the first image and the second image are the same. When the contours of the object 2 in the first image and the second image are the same, the comparing module 104 determines that the object 2 in the first image is identical with the object 2 in the second image. When the contours of the object 2 in the first image and the second image are not the same, the comparing module 104 determines that the object 2 in the first image is not identical with the object 2 in the second image.

In other embodiments, when the first image and the second image each contains multiple objects 2, the comparing module 104 recognizes the contours of each of the multiple objects 2 in the first image and the second image by the edge detection algorithm, and determines whether the respective contours of each object 2 in the first image and the second image are the same. When the respective contours of each object 2 in the first image and the second image are the same, the comparing module 104 determines that each of the multiple objects 2 in the first image are identical with the corresponding object 2 in the second image. When the contour of at least one object 2 in the first image are not the same as the contour of corresponding object 2 in the second image, the comparing module 104 determines that the at least one object 2 in the first image is not identical with the object 2 in the second image.

If the object 2 in the first image is not identical with the object 2 in the second image, the determining module 105 is used to determine that the object 2 is a non-planar obstacle, such as a stone, a box, or a cabinet.

In other embodiments, if the object 2 in the first image is not identical with the object 2 in the second image, the determining module 105 determine that the object 2 is real. For example, when the image capturing device 40 captures the first image of the object 2, and electronic device 1 recognizes the object 2 as a vehicle or a person according to the first image, if the vehicle or the person in the first image is not identical with the vehicle or the person in the second image, the determining module 105 determines that the vehicle or the person is real.

If the object 2 in the first image is identical with the object 2 in the second image, the determining module 105 determines that the object 2 is a planar obstacle, such as a wall space.

In other embodiments, if the object 2 in the first image is identical with the object 2 in the second image, the determining module 105 determines that the object 2 is not real. For example, when the image capturing device 40 captures the first image of the object 2, and electronic device 1 recognizes the object 2 as a vehicle or a person according to the first image, if the vehicle or the person in the first image is identical with the vehicle or the person in the second image, the determining module 105 determines that the vehicle or the person is not real. That is, the vehicle or the person is planar, and may be existed in a wall painting, a display screen, or a billboard around the electronic device 1.

In other embodiments, if the first image and the second image both show multiple objects 2, when each of the multiple objects 2 in the first image are identical with the corresponding object 2 in the second image, the determining module 105 determines that the multiple objects 2 are the planar obstacle. When at least one of the multiple objects 2 in the first image is not identical with the corresponding object 2 in the second image, the determining module 105 determines that the at least one of the multiple objects 2 is the non-planar obstacle.

As illustrated in FIG. 1, in at least one embodiment, the electronic device 1 further includes a second driving device 100. The second driving device 100 can be an electric motor arranged in the electronic device 1.

If the determining module 105 determines that the object 2 is the non-planar obstacle, the control module 106 is used to control the second driving device 100 to drive the electronic device 1 to avoid and bypass the object 2 when the electronic device 1 is moving.

If the determining module 105 determines that the object 2 is the planar obstacle, the control module 106 controls the second driving device 100 to drive the electronic device 1 to change an orientation, such as turn left or turn right, when the electronic device 1 is moving.

Figure 5:
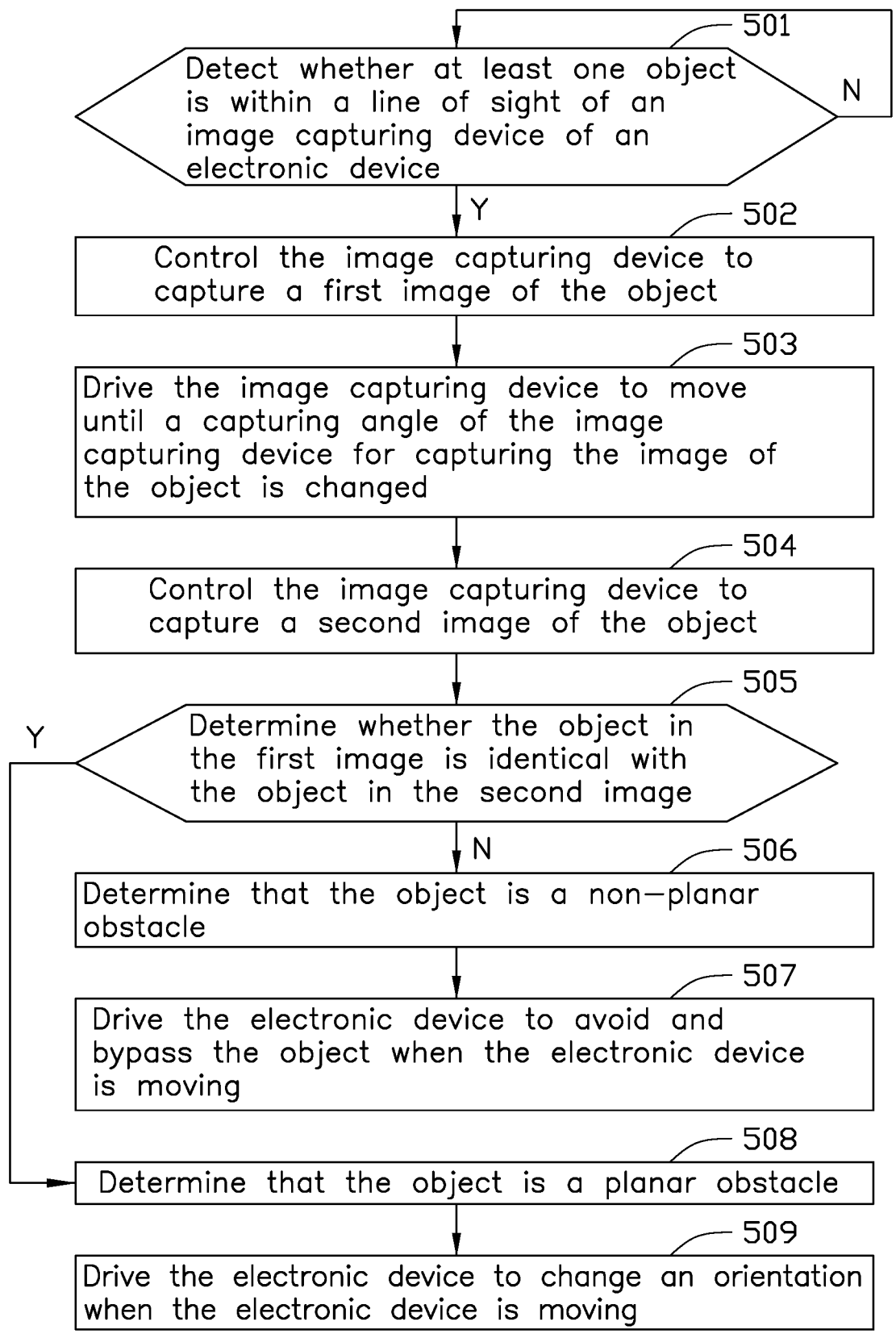
FIG. 5 illustrates a flowchart of an embodiment a method for detecting an obstacle.

FIG. 5 illustrates a flowchart of an embodiment of a method for detecting an obstacle. The method is provided by way of example, as there are a variety of ways to carry out the method. The method described below can be carried out using the configurations illustrated in FIG. 1, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, the detecting module 101 controls the detecting device 30 to detect whether at least one object 2 is within a line of sight of the image capturing device 40. If the at least one object 2 is within the line of sight of the image capturing device 40, the process goes to block 502. If there is no object 2 is within the line of sight of the image capturing device 40, the process continues in block 501.

At block 502, the image capturing module 102 controls the image capturing device 40 to capture a first image of the object 2.

At block 503, the driving module 103 controls the first driving device 50 to drive the image capturing device 40 to move until a capturing angle of the image capturing device 40 for capturing the image of the object 2 is changed.

At block 504, the image capturing module 102 further controls the image capturing device 40 to capture a second image of the object 2.

At block 505, the comparing module 104 determines whether the object 2 in the first image is identical with the object 2 in the second image. If the object 2 in the first image is not identical with the object 2 in the second image, the process goes to block 506. If the object 2 in the first image is identical with the object 2 in the second image, the process goes to block 508.

At block 506, the determining module 105 determines that the object 2 is a non-planar obstacle.

At block 507, the control module 106 controls the second driving device 100 to drive the electronic device 1 to avoid and bypass the object 2 when the electronic device 1 is moving.

At block 508, the determining module 105 determines that the object 2 is a planar obstacle.

At block 509, the control module 106 controls the second driving device 100 to drive the electronic device 1 to change an orientation when the electronic device 1 is moving.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
a processor;
a detecting device coupled to the processor;
an image capturing device coupled to the processor;
a first driving device coupled to the processor; and a storage device coupled to the processor and storing instructions for execution by the processor to cause the processor to:
  control the detecting device to detect whether at least one object is within a line of sight of the image capturing device;
  control the image capturing device to capture a first image of the object if the object is detected;
  control the first driving device to change a capturing angle of the image capturing device for capturing a second image of the object; and
  determine that the object is a non-planar obstacle if the object in the first image is not identical with the object in the second image.

2. The electronic device according to claim 1, wherein the processor is further caused to:
  determine that the object is a planar obstacle if the object in the first image is identical with the object in the second image.

3. The electronic device according to claim 1, wherein the processor is further caused to:
  control the detecting device to transmits infrared rays towards front of the electronic device;
  calculate a distance between the object and the electronic device when reflected infrared rays are received; and
  detect that the object is within the line of sight of the image capturing device when the distance is equal to or less than a predetermined distance.

4. The electronic device according to claim 1, wherein the processor is further caused to:
  control the first driving device to drive the image capturing device to move a predetermined number of times, wherein a capturing angle for capturing the image of the object is different after each move of the image capturing device; and
  control the image capturing device to capture the second image of the object every time that the capturing angle for capturing the image of the object is changed.

5. The electronic device according to claim 1, further comprising:
  a slide rail;
  a base comprising a plurality of wheels and movably arranged on the slide rail, wherein the first driving device is arranged on at least one of the plurality of wheels; and
  a fixing rod arranged on the base, wherein the image capturing device is arranged on the fixing rod.

6. The electronic device according to claim 5, wherein the slide rail is curved, the processor is further caused to:
  control the first driving device to drive the plurality of wheels to slide along the slide rail, wherein the base, the fixing rod, and the image capturing device are driven to move along the slide rail, the capturing angles of the image capturing device for capturing the images of the object are changed by driving the imaging capture device being along the slide rail.

7. The electronic device according to claim 5, wherein the slide rail is linear, the electronic device further comprises:
  a bearing member electrically connected with the first driving device and arranged on an end of the fixing rod;
  the processor is further caused to:
  control the first driving device to drive the base and the image capturing device to move along the slide rail; and
  control the bearing member to drive the fixing rod to rotate, the image capturing device is driven to change orientations by the fixing rod, the capturing angles of the image capturing device for capturing the images of the object are changed by changing the orientations of the image capturing device.

8. The electronic device according to claim 1, further comprising:
  a second driving device coupled to the processor; wherein the processor is further caused to:
  control the second driving device to drive the electronic device to avoid and bypass the object when the electronic device is moving if the object is the non-planar obstacle.

9. A method for detecting an obstacle comprising:
  controlling a detecting device of an electronic device to detect whether at least one object is within a line of sight of an image capturing device of the electronic device;
  controlling the image capturing device to capture a first image of the object if the object is detected;
  controlling a first driving device of the electronic device to change a capturing angle of the image capturing device for capturing a second image of the object; and
  determining that the object is a non-planar obstacle if the object in the first image is not identical with the object in the second image.

10. The method according to claim 8, further comprising:
  determining that the object is a planar obstacle if the object in the first image is identical with the object in the second image.

11. The method according to claim 9, wherein the method of detecting whether at least one object is within a predetermined distance range in front of the electronic device comprises:
  controlling the detecting device to transmits infrared rays towards front of the electronic device;
  calculating a distance between the object and the electronic device when reflected infrared rays are received; and
  detecting that the object is within the line of sight of the image capturing device when the distance is equal to or less than a predetermined distance.

12. The method according to claim 9, further comprising:
  controlling the first driving device to drive the image capturing device to move a predetermined number of times; wherein a capturing angle for capturing the image of the object is different after each move of the image capturing device; and
  controlling the image capturing device to capture the second image of the object every time that the capturing angle for capturing the image of the object is changed.

13. The method according to claim 9, wherein the electronic device further comprises:
  a slide rail;
  a base comprising a plurality of wheels and movably arranged on the slide rail, wherein the first driving device is arranged on at least one of the plurality of wheels; and
  a fixing rod arranged on the base; wherein the image capturing device is arranged on the fixing rod.

14. The method according to claim 13, wherein the slide rail is curved, the method of driving the image capturing device to move until a capturing angle of the image capturing device for capturing image of the object is changed comprises:
  controlling the first driving device to drive the plurality of wheels to slide along the slide rail, wherein the base, the fixing rod, and the image capturing device are driven to move along the slide rail, the capturing angles of the image capturing device for capturing the images of the object are changed by driving the imaging capture device being along the slide rail.

15. The method according to claim 13, wherein the slide rail is linear, the electronic device further comprises a bearing member electrically connected with the first driving device and arranged on an end of the fixing rod;

the method of driving the image capturing device to move until a capturing angle of the image capturing device for capturing image of the object is changed comprises:

controlling the first driving device to drive the base and the image capturing device to move along the slide rail; and controlling the bearing member to drive the fixing rod to rotate, the image capturing device is driven to change orientations by the fixing rod, the capturing angles of the image capturing device for capturing the images of the object are changed by changing the orientations of the image capturing device.

16. The method according to claim 9, further comprising:

controlling a second driving device of the electronic device to drive the electronic device to avoid and bypass the object when the electronic device is moving if the object is the non-planar obstacle.

* * * * *